Dec. 3, 1940.   H. E. W. QUEST   2,223,740
WALL STRUCTURE
Filed Aug. 3, 1938   2 Sheets-Sheet 1

Inventor:
HEINRICH ERNST WILHELM QUEST
By:
Richards & Geier
Attorneys

Dec. 3, 1940. H. E. W. QUEST 2,223,740
WALL STRUCTURE
Filed Aug. 3, 1938 2 Sheets-Sheet 2
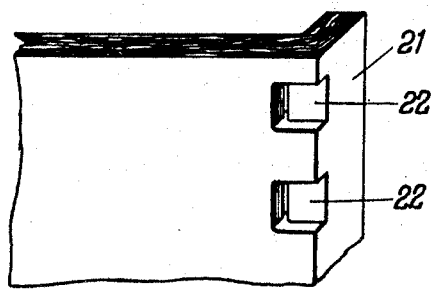
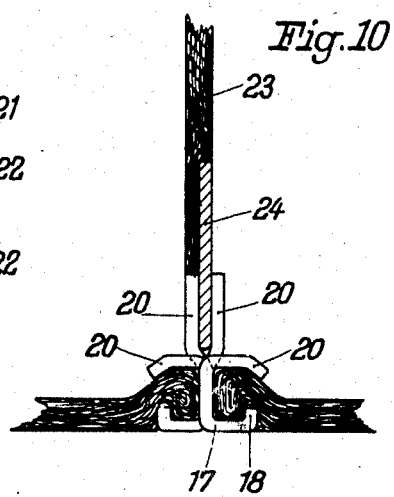
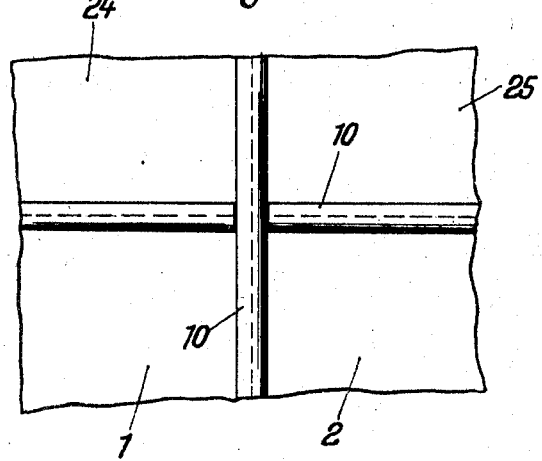
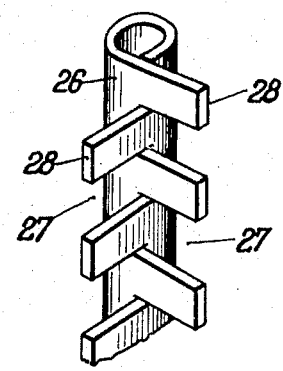
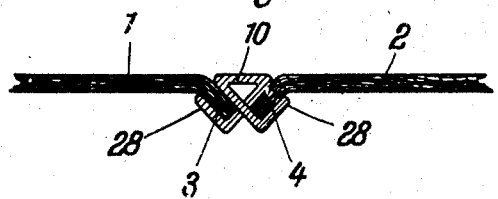
Inventor:
HEINRICH ERNST WILHELM QUEST
By:
Richards & Geier
Attorneys Patented Dec. 3, 1940

2,223,740

UNITED STATES PATENT OFFICE 2,223,740

WALL STRUCTURE

Heinrich Ernst Wilhelm Quest, Chemnitz, Germany

Application August 3, 1938, Serial No. 222,876
In Germany August 3, 1937

14 Claims. (Cl. 20—92)

This invention relates to a wall structure and in particular to wall structures made up of sheet-like pressings of a material of synthetic resinous character, such as irregularly distributed or preferably laminated fibrous material saturated in a synthetic resin with the synthetic resin acting as a binding agent, the pressings being formed under the action of heat and pressure. Such like material will hereinafter be generally referred to as synthetic resinous material. Such pressings are being increasingly proposed for use in wall structures for vehicle parts and vehicle bodies, especially automobile bodies, but the invention relates to any wall structure composed of such pressings.

It is customary to connect assemblies of such pressings by bolting or riveting this being the form of connection which primarily suggested itself by analogy with connection of steel sheets. Another form of connection is by adhesive, particularly synthetic resin adhesive which is comparable to autogenous welding of steel sheets. In all such forms of connections however the strength of the connected edges is considerably less than the strength of the rest of the pressings especially if the pressings or sheets are made very thin. In order to obtain the rigid and durable connection therefore it has been necessary to provide the pressings with greatly enlarged edges with the disadvantageous result that the sheets take considerably longer time to harden during the pressing operation and moreover this means an unnecessary accumulation of material at those places along the connected edges which are not engaged by the bolts or rivets.

The primary object of the present invention is to provide in a wall structure an improved combination of an assembly of sheet-like pressings of synthetic resinous material with connecting means, in which the provision of holes for bolts or rivets is made unnecessary whilst the strength of the connected edges is as great as if not greater than the strength of the rest of the pressings, the manufacture of the sheets being therefore considerably simplified and all subsequent or finishing work avoided.

Another object of the invention is to provide, in combination with an assembly of such sheets, connecting means which engages the edges of the sheets to be connected substantially continuously throughout the length of the edges, said connecting means taking the form of a metal strip interposed between said edges.

A further object of the invention is to provide connecting means in the form of a metal strip clamping the connected edges against an abutment, the clamping connection being obtained by deformation of the metal strip, so that the deformed portion of the metal strip which may be bulbous and the abutment provide a welcome reinforcement of the wall structure so assembled, enabling reinforcing frame members or ribs formed on the pressings and taking the place of such reinforcing frame members to be dispensed with. This will be particularly advantageous in cases where the wall structure forms part of a large body, such as an automobile body in which normally such reinforcing framework is required. Especially the deformed portion of the metal strip will provide substantial reinforcement of the whole wall structure as it constitutes, in conjunction with other metal strips between the other pressings of the wall structure, a strong metal framework capable of withstanding heavy stresses and enabling a separate framework to be dispensed with. The strength and rigidity of this framework substitute is still further improved if as provided according to the invention the metal strip is of split pin section the loop of the split pin constituting a bulbous head portion of the strip and the limbs of the split pin constituting a double base portion of said strip.

It is a still further object of the invention to provide a double wall structure of parallel synthetic resinous pressings, two parallel pairs of such pressings being connected together, at the same time as the individual pressings in each pair, by a single split pin section metal strip clamping them against a single abutment between the two pairs of pressings, means being provided to ensure rigid engagement of the metal strip with both pairs of pressings. This enables the production of double wall structures by simplified means it being unnecessary to connect each of the parallel pairs of pressings separately whilst substantial reinforcement between the parallel pressings of the double wall structure is again obtained by this means.

A still further object of the invention is to obtain the rigid and substantially continuous connection of the pressings, together with the advantageous incidental reinforcement of the wall structure, by an alternative connecting means again consisting of a metal strip interposed between the edges of the pressings to be connected, the strip in this case having a series of oppositely directed flange-like lugs top and bottom, the lugs being in the form of clasps gripping preferably moulded edges of the pressings, one series of lugs serving as an abutment for the pressings against which the pressings are clamped by the other series of lugs. By this means a considerably reinforced seam is produced between the pressings which is comparable to the well-known "Zip-Fastener" connection, the connection however being permanent and more rigid.

The above and other objects and features of the invention necessary for achieving those objects and including various novel combinations and desirable specific constructions will be apparent from the following description of a number of preferred embodiments and variations given by way of illustration and shown in the accompanying drawings in which, so far as applicable the same reference characters have been used to designate corresponding parts throughout the several figures and in which:

Fig. 9 is a part sectional perspective view of one of the pressings for a part of the assembly according to Fig. 7;

Fig. 10 is a cross-sectional elevation of the assembly shown in Fig. 7 modified by the addition to the assembly of a third pressing and means for connecting it, parts of the pressings near the connected edges only being shown;

Fig. 11 is a plan of an assembly of four pressings in the same plane together with the connecting means;

Fig. 12 is a perspective view of another modified form of connecting metal strip developed from that shown in Fig. 1, and Fig. 13 is a cross-sectional elevation of an assembly similar to Fig. 1 modified by the incorporation of the connecting metal strip shown in Fig. 12.

Figure 1:
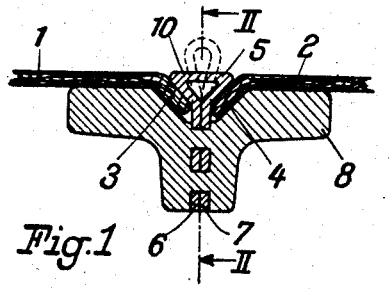
Fig. 1 is a cross-sectional elevation of an assembly of pressings and connecting means, only parts of the pressings near the place of connection being shown.
Figure 2:
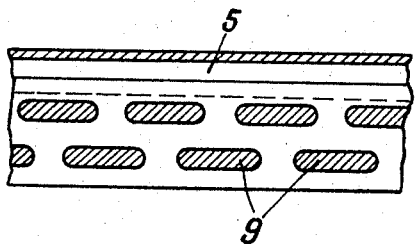
Fig. 2 is a section on the line of II—II of Fig. 1.

Referring first to the embodiment shown in Figs. 1 and 2, two wall members 1 and 2 constituted by sheets pressed of synthetic resinous material are formed during the pressing operation with flanges 3 and 4 and are assembled with the flanged edges 3 and 4 parallel to one another, forming between them a V-shaped recess. A deformable strip 5 of soft metal serves as connecting means for the assembly of pressings 1, 2. The metal strip 5 is of split pin section so as to comprise a bulbous head portion 10 provided by the loop of the split pin and a double base portion constituted by the limbs 6, 7 of the split pin. The metal strip 5 extends continuously throughout the length of the edges 3, 4 of the pressings 1, 2 and has keyed to the base portion 6, 7 a rib 8, also being a pressing of synthetic resinous material and serving as an abutment member for the sheets 1, 2. For this purpose the rib 8 is moulded during the pressing operation into a convenient shape as shown in the drawings, especially having a substantial upper face for the pressings 1 and 2 to abut on, and a V-shaped central recess extending the whole length of the rib 8 to receive the flanged edges 3 and 4. The rib 8 also extends along the whole length of the connected edges of the pressings 1, 2 and the keying to the metal strip 5 is obtained by the synthetic resinous mass thereof penetrating the metal strip 5 through apertures 9 provided in the strip 5 in its base portion 6, 7.

Fig. 1 shows the complete assembly in rigid connection, the bulbous head portion 10 before deformation thereof being shown in dotted lines. The pressings 1 and 2 are assembled on the abutment rib 8 with the metal strip 5 passing between the pressings 1 and 2, the bulbous head 10 then being deformed to enter into the recess defined by the flanged edges 3, 4, after which it has the triangular shape shown and is flush with the outer face of the pressings 1, 2. Pressings 1, 2 are thus rigidly connected throughout the length of the edges 3, 4 by the latter being clamped against the abutment rib 8.

Figure 3:
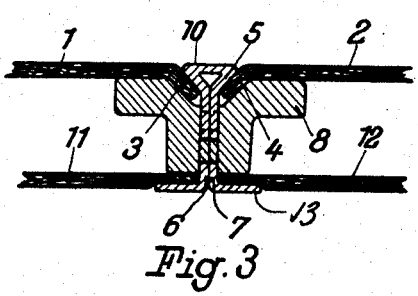
Fig. 3 is a cross-sectional elevation of an assembly similar to Fig. 1 for a double wall structure.
Figure 4:
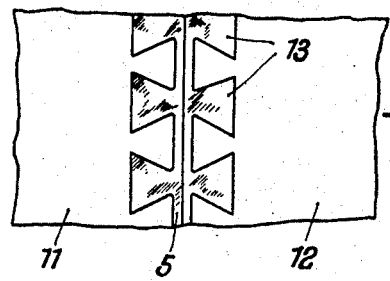
Fig. 4 is an underneath plan of the embodiment shown in Fig. 3.

Figs. 3 and 4 show an assembly similar to Figs. 1 and 2 modified for a double wall structure. In this case two parallel pairs of pressings are clamped against the abutment rib 8, namely, in addition to the pressings 1 and 2, the pressings 11 and 12 which abut against the lower faces of the rib 8. The construction and connection of the members 1, 2, 5, 8, 10 is similar to that shown in Fig. 1, but the base portion parts 6, 7 of the metal strip 5 have flange-like extensions 13 which are bent over in opposite directions into clamping engagement with the pressings 11, 12. These extensions of the double base portion 6, 7 are of dovetail shape as shown in Fig. 4 and engage correspondingly shaped depressions in the pressings 11, 12.

Figure 5:
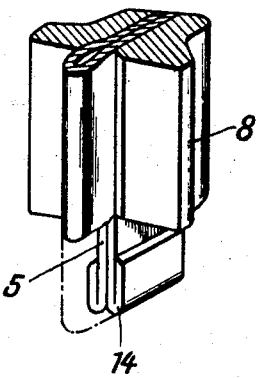
Figs. 5 and 6 are perspective views of two end portions respectively of assemblies similar to Fig. 1 showing means for connecting such assemblies end to end with the pressings in the same plane.
Figure 6:
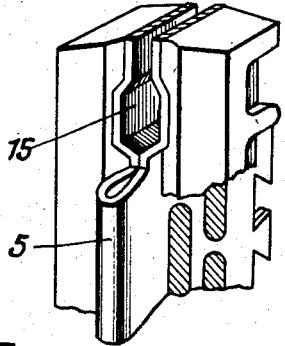

A manner of connecting two assemblies of the kind shown in Fig. 1 with the pressings all in the same plane and the metal strips and abutment ribs abutting end to end is shown in Figs. 5 and 6, Fig. 5 showing one of the assemblies and Fig. 6 the other assembly, the pressings themselves having been omitted in both figures for clearness and the rib 8 in Fig. 6 being broken away to show the metal strip 5. The one assembly shown in Fig. 5 has its metal strip 5 formed with an enlargement 14 by doubling back the two parts of the base portions 6, 7 of the metal strip 5 thus constituting a male member. The rib 8 and the sheets 1, 2 stop short of the male member 14 with the strip 5 projecting therefrom for a short distance. The head portion 10 of the strip 5 is shown cut away to give a view of the male member 14 but must be imagined completed along the dotted line. The strip 5 of the other assembly shown in Fig. 6 is formed with an enlargement or cavity 15 between the base portion parts 6 and 7 transversely of the strip, the rib 8 being formed with a corresponding enlargement into which the enlarged base portion of the strip 5 fits. The cavity 15 which constitutes a female member is provided just short of the end of the assembly and is continued to the end in a reduced passage of bottle neck section. To connect the two assemblies the male member 14 is slid into the cavity 15 with the projecting part of the strip 5 of the assembly according to Fig. 5 engaged by the bottle neck section extension of the base portion of the strip 5 of the assembly according to Fig. 6.

In order to provide space for the head portion 10 of the strip 5 of the assembly according to Fig. 5 the head portion 10 of the strip 5 of the assembly according to Fig. 6 stops short of the cavity 15 so that all the parts of both assemblies abut end to end and the assemblies are locked and rigidly connected together by the engagement of the male and female members. The connection is preferably strengthened by welding the two metal strips 5 together at the places where they contact.

Figure 7:
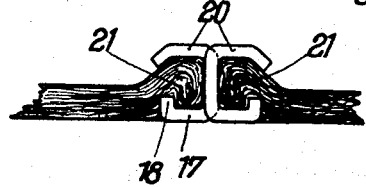
Fig. 7 is a cross sectional elevation similar to Fig. 1 of a modified form of construction of the assembly parts.
Figure 8:
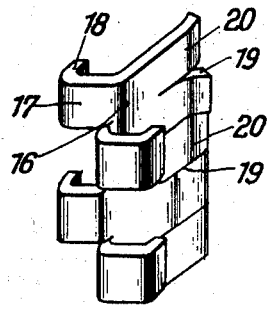
Fig. 8 is a perspective view of the connecting metal strip used in the assembly according to Fig. 7.

Figs. 7, 8 and 9 show a modified assembly. The metal strip in this case is in the form of a flat band 16 having one edge provided with flange-like lugs 17 alternately bent in two directions as shown, each lug having in turn a flange 18 so that the lugs take the form of clasps. This series of oppositely directed lugs 17 serves as an abutment to the pressings, and is provided on the base portion of the band or strip 16, the head portion being constituted by another series of lugs 20 formed, like the lugs 17, by slitting and bending over. Before assembling the pressings the lugs 20 are only slightly bent over in opposite directions as shown in Fig. 8. As shown in Fig. 9 the pressings are formed with moulded edges 21 which have depressions 22 formed in them, shaped to correspond to the shape of the lugs 17. Fig. 7 shows the finished assembly. The clasp-like lugs 17 are disposed in the corresponding recesses 22 and engage the moulded edges 21 so as to serve as an abutment thereto. The outer faces of the lugs lie flush with the outer faces of the pressings. As in Fig. 1 the base portion of the metal strip passes between the edges of the pressings and the lugs 20 which in this case constitute the head portion of the metal band or strip 16 are deformed to correspond to and grip the moulded edges 21 of the pressings as shown. The deformation of the head portion lugs 20 can be obtained by means of a roller continuously moved along the seam. The lugs 20 thus clamp the edges 21 against the abutment lugs 17 the edges being thus firmly gripped and held between the lugs 17 and 20 to rigidly connect together the two pressings.

Fig. 10 shows the assembly according to Fig. 7 modified by the addition of a third pressing 23 at right angles to the other two pressings, which are in the same plane, the pressing 23 being positioned with one edge adjacent the two adjacent edges of the other two pressings. The connection of the latter by means of the lugs 17 and 20 of the metal strip 16 is the same as in Fig. 7 except that a number of the head portion lugs 20 are not deformed but remain standing upwardly at right angles to the deformed lugs 20 in the direction of the third pressing 23 and serving to secure the latter to the other two pressings. For this purpose a metal plate 24 secured to the pressing 23, for example by being united therewith in the pressing operation after the manner of vulcanisation so as to be flush with one face thereof and projecting beyond the edge thereof has its projecting part engaged on both sides by the upstanding head portion lugs 20, the metal parts 24 and 20 being welded together or otherwise rigidly secured together. In this manner the metal strip 16 rigidly connects together not only the two pressings in the same plane but also the third pressing 23 in the plane perpendicular thereto.

Fig. 11 shows an assembly of four pressings in the same plane, the principle of this assembly covering any of the constructional forms of connecting metal strips and co-acting edges of the pressings herein described or to be described, but in the present example shown in Fig. 11 the assembly is according to Fig. 1. As in Fig. 1 two pressings 1 and 2 are connected together by a metal strip 5 of which the bulbous head portion 10 can be seen in Fig. 11. Two more pressings 24 and 25 are arranged in the same plane as the pressings 1 and 2, the pressing 24 being connected to the pressing 1 and the pressing 25 to the pressing 2 in like manner as the pressings 1 and 2 in Fig. 1. The feature which characterises this assembly is that the metal strip 5 connecting together the pressings 1 and 2 and the abutment rib 8 are extended beyond the points of connection of the pressings 1, 2 with the pressing 24, 25, and between the adjacent edges of the pressings 24 and 25 to connect together the pressings 24 and 25 upon a substantial part thereof, the connections between the pressings 24, 25 being of course the same as that between the pressings 1 and 2.

Fig. 12 shows a metal strip departing from the construction of the metal strips according to Figs. 1 and 8 but being on the whole a development of the metal strip according to Fig. 1 which is also clear from the fact that the assembly of which it forms part comprises pressings of the same construction as in Fig. 1 as will be described with reference to Fig. 13. The metal strip 26 according to Fig. 12 is again of split pin section as in Fig. 1 but the two parts of the double base portion (constituted by the limbs 6, 7 of the split pin section in Fig. 1) are provided with slots 27 leaving lugs 28 in such a manner that the lugs 28 on one part of the base portion are disposed opposite the slots 27 in the other part of the base portion of the lugs 28 being interlaced, as clearly shown in Fig. 12 so as to be substantially oppositely directed.

Fig. 13 shows the finished assembly incorporating the metal strip according to Fig. 12. As in Fig. 1, pressings 1 and 2 having flanged edges 3 and 4 are assembled together with the flanged edges forming a V-shaped recess in the outer face of the two pressings. The metal strip 26 is interposed between the two pressings 1 and 2 and the ends of the oppositely directed lugs 28 are bent over outwardly so as to constitute flange-like extensions thereof disposed at an angle corresponding to the longitudinal central recess in the abutment rib 8 in Fig. 1, and receiving the flanged edges 3 and 4. These flange-like extensions of the lugs 28 thus serve as an abutment for the edges 3 and 4 in like manner as the abutment 8 in Fig. 1. The bulbous head portion of the metal strip 26 is again deformed to assume the triangular shape shown in Fig. 13 and to enter into the recess defined by the flanged edges 3 and 4 so that the outer face of the head portion 10 is flush with the outer face of the pressings 1 and 2. The head portion 10 thus deformed clamps the flanges 3 and 4 against the abutment flanges on the lugs 28, the edges 3 and 4 being thereby firmly gripped and the pressings 1 and 2 rigidly connected together.

The assemblies showing the various figures and described in the foregoing are suitable for use in wall structures for flat or box-like bodies of all kinds such as for parts and bodies of vehicles and more particularly for automobile bodies in which an even and flush outer face is desired, because as will be seen from the foregoing the head portions of the connecting strips in all embodiments are flush with the outer faces of the pressings which is an additional advantage obtained by the present invention and obtainable in the known forms of connecting pressings by bolts or rivets only at the expense of the strength of the pressings at the points of connections such as by flush riveting or the like. Any grooves or gaps left on the outer faces of the assemblies between the deformed head portion and the pressings, as is especially liable to happen in the embodiments according to Figs. 1, 3 and 13 are preferably filled up or closed by a plastic synthetic resinous adhesive or other material used for dressing and finishing assemblies of this type.

The pressings in all the embodiments described as well as the abutment ribs in Figs. 1, 3, 5 and 6 are made of superimposed paper or fabric strips or strips of other like coherent fibrous material saturated in a synthetic resin and pressed in matrices under the action of heat and pressure. The metal strips may be of any soft metal but are preferably of aluminium of great strength or of soft iron of the hardness of conventional rivets. The use of aluminium for these connecting metal strips has the advantage that the coefficient of expansion of the strips and of the adjacent synthetic resinous parts of the assembly is the same so that the connection will not become loose even if subjected to considerable fluctuations in temperature.

What I claim and desire to secure by Letters Patent is:

1. In a wall structure, in combination, an assembly of sheet-like pressings of synthetic resinous material having adjacent edges disposed in parallel spaced relationship, a deformable metal strip interposed between said adjacent edges of said pressings, said strip comprising a bulbous head portion and a base portion, and a moulded abutment member of synthetic resinous material for said pressings keyed to said base portion, said bulbous head portion being deformed into engagement with said edges and clamping said edges against said abutment member to connect said pressings in fixed relationship.

2. In a wall structure, in combination, an assembly of sheet-like pressings of synthetic resinous material having adjacent edges disposed in parallel spaced relationship, said edges being flanged to define a V-shaped recess in one face of the assembly, a deformable metal strip interposed between said edges, said strip comprising a head portion and a base portion, and an abutment for said pressings associated with said base portion, said head portion being deformed to enter into said V-shaped recess flush with said face of the assembly and clamping said flanged edges against said abutment to connect said pressings in fixed relationship.

3. In a wall structure, in combination, an assembly of sheet-like pressings of synthetic resinous material having adjacent edges disposed in parallel spaced relationship, said edges being flanged to define a V-shaped recess in one face of the assembly, a deformable metal strip interposed between said edges, said strip comprising a bulbous head portion and a base portion, and a moulded abutment member of synthetic resinous material for said pressings keyed to said base portion, and receiving said flanged edges, said bulbous head portion being deformed to enter into said V-shaped recess flush with said face of the assembly and clamping said flanged edges against said abutment member to connect said pressings in fixed relationship.

4. In a wall structure, in combination, an assembly of sheet-like pressings of synthetic resinous material having adjacent edges disposed in parallel spaced relationship, said edges being flanged to define a V-shaped recess in one face of the assembly, a deformable metal strip interposed between said adjacent edges of said pressings, said strip being of split-pin section to constitute a bulbous head portion and a double base portion of said strip, and a moulded abutment member of synthetic resinous material for said pressings keyed to said double base portion and receiving said flanged edges, said bulbous head portion being deformed to enter into said V-shaped recess flush with said face of the assembly and clamping said flanged edges against said abutment member to connect said pressings in fixed relationship.

5. In a wall structure, in combination, an assembly of sheet-like pressings of synthetic resinous material consisting of a first pair of pressings arranged in one plane and of a second pair of pressings arranged in another plane parallel to said first-mentioned plane, said pressings in each pair having adjacent edges disposed in parallel spaced relationship, a deformable metal strip interposed between said adjacent edges of both said pairs of pressings, said strip being of split-pin section to constitute a bulbous head portion and a double base portion of said strip, and a moulded abutment member of synthetic resinous material for both said pairs of pressings secured to said double base portion intermediate of said two pairs of pressings, said bulbous head portion being deformed into engagement with said adjacent edges of said first pair of pressings and said double base portion being deformed in opposite directions into engagement with said adjacent edges of said second pair of pressings, said head portion and said base portion clamping said adjacent edges of both said pairs of pressings against said abutment member to connect all said pressings in fixed relationship.

6. In a wall structure, in combination, an assembly of sheet-like pressings of synthetic resinous material consisting of a first pair of pressings arranged in one plane and of a second pair of pressings arranged in another plane parallel to said first mentioned plane, said pressings in each pair having adjacent edges disposed in parallel spaced relationship, said adjacent edges of said first pair of pressings being flanged to define a V-shaped recess in one face of said first pair of pressings, and said adjacent edges of said second pair of pressings having dovetail-shaped depressions in one face of said second pair of pressings, a deformable metal strip interposed between said adjacent edges of both said pairs of pressings, said strip being of split-pin section to constitute a bulbous head portion and a double base portion of said strip, dovetail-shaped extensions of said double base portion and a moulded abutment member of synthetic resinous material for both said pairs of pressings secured to said double base portion intermediate of said two pairs of pressings and receiving said flanged edges of said first pair of pressings, said bulbous head portion being deformed to enter into said V-shaped recess flush with said face of said first pair of pressings, and said dovetail-shaped base portion extensions being deformed to enter into said dovetail-shaped depressions in said second pair of pressings, said head portion and said dovetail-shaped base portion extensions clamping said adjacent edges of both said pairs of pressings against said abutment member to connect all said pressings in fixed relationship.

7. In a wall structure, in combination, an assembly of sheet-like pressings of synthetic resinous material consisting of two pairs of pressings in the same plane, said pressings in each pair having adjacent edges disposed in parallel spaced relationship, a deformable metal strip interposed between said adjacent edges of each pair of said pressings and extending continuously throughout the length of each pair of said pressings, said strip being of split-pin section to constitute a bulbous head portion and a double base portion of said strip, a moulded abutment member of synthetic resinous material for each pair of said pressings keyed to said double base portion and extending throughout the length thereof, said bulbous head portion being deformed into engagement with said adjacent edges of said pair of pressings and clamping said adjacent edges against said abutment member, a male member on one end of said double base portion of said strip in one pair of said pressings and a female member in the adjoining end of said double base portion of said strip in the other pair of said pressings, said male member engaging said female member and rigidly securing said abutment members end-to-end to connect all said pressings in fixed relationship.

8. In a wall structure, in combination, an assembly of sheet-like pressings of synthetic resinous material, having adjacent edges disposed in parallel spaced relationship, said edges being flanged to define a recess in one face of the assembly, a deformable metal strip interposed between said adjacent edges of said pressings, said strip comprising a head portion and a base portion, and substantially oppositely directed flange-like extensions integral therewith, said flange-like extensions constituting an abutment for said pressings, said head portion being deformed into engagement with said edges and to enter said recess, and clamping said edges against said flange-like abutment extensions to connect said pressings in fixed relationship.

9. In a wall structure, in combination, an assembly of sheet-like pressings of synthetic resinous material having adjacent edges disposed in parallel spaced relationship, said edges being flanged to define a recess in one face of the assembly, a deformable metal strip interposed between said adjacent edges of said pressings, said strip comprising a head portion and a base portion, said head portion consisting of a series of lugs alternately extending in opposed directions, and a series of flange-like lugs on said base portion alternately extending in opposed directions, corresponding to said head portion lugs, said flange-like lugs constituting an abutment for said pressings, said head portion lugs being deformed into engagement with said edges and to enter said recess, and clamping said edges against said flange-like abutment lugs to connect said pressings in fixed relationship.

10. In a wall structure, in combination, an assembly of sheet-like pressings of synthetic resinous material having adjacent edges disposed in parallel spaced relationship, said edges being moulded and defining recesses in one face of the assembly, a deformable metal strip interposed between said edges, said strip comprising a head portion and a base portion, said head portion consisting of a series of lugs alternately extending in opposed directions, and a series of flange-like lugs on said base portion alternately extending in opposed directions, corresponding to said head portion lugs, and shaped to fit said recesses and disposed therein flush with said face of the assembly, said flange-like lugs constituting an abutment for said pressings, said head portion lugs being deformed to grip said moulded edges and clamping said moulded edges against said flange-like abutment lugs to connect said pressings in fixed relationship.

11. In a wall structure, in combination, an assembly of sheet-like pressings of synthetic resinous material consisting of a pair of pressings in one plane and of a third pressing in a plane perpendicular to said first-mentioned plane, all said pressings having adjacent edges disposed in parallel spaced relationship, a deformable metal strip interposed between said adjacent edges of said pair of pressings, said strip comprising a head portion and a base portion, said head portion consisting of a series of substantially oppositely directed lugs and a second series of lugs directed substantially perpendicularly to said oppositely directed lugs, and a series of flange-like lugs on said base portion alternately extending in opposite directions, said flange-like lugs constituting an abutment for said pair of pressings, said second series of head portion lugs being rigidly associated with said adjacent edge of said third pressing, and said oppositely directed head portion lugs being deformed into engagement with said adjacent edges of said pair of pressings, and clamping said edges against said flange-like abutment lugs, to connect all said pressings in fixed relationship.

12. In a wall structure, in combination, an assembly of sheet-like pressings of synthetic resinous material consisting of a pair of pressings in one plane and of a third pressing in a plane perpendicular to said first mentioned plane, all said pressings having adjacent edges disposed in parallel spaced relationship, said adjacent edges of said pair of pressings being moulded and defining recesses in one face of said pair of pressings, a deformable metal strip interposed between said adjacent edges of said pair of pressings, said strip comprising a head portion and a base portion, said head portion consisting of a series of substantially oppositely directed lugs and a second series of lugs directed substantially perpendicularly to said oppositely directed lugs, a series of flange-like lugs on said base portion alternately extending in opposite directions, and shaped to fit said recesses and disposed therein flush with said face of said pair of pressings, said flange-like lugs constituting an abutment for said pair of pressings, and a metal plate welded to said second series of head portion lugs and rigidly securing said third pressing to said second series of head portion lugs, said oppositely directed head portion lugs, being deformed to grip said moulded edges of said pair of pressings and clamping said moulded edges against said flange-like abutment lugs to connect all said pressings in fixed relationship.

13. In a wall structure, in combination, an assembly of sheet-like pressings of synthetic resinous material having adjacent edges disposed in parallel spaced relationship, said edges being flanged to define a recess in one face of the assembly and having recesses formed on the other face of the assembly, a deformable elongated metal strip interposed between said edges and being substantially coextensive therewith, said strip including a head portion and a two-part base portion of said strip, the two parts of said base portion being slotted to constitute a series of lugs extending in substantially opposed directions, constituting an abutment for said pressings and fitting into recesses formed on the other face of the assembly to receive said flanged edges, said head portion being deformed to enter into the first-mentioned recess flush with said face of the assembly and clamping said flanged edges against said abutment to connect said pressings in fixed relationship.

14. In a wall structure, in combination, an assembly of sheet-like pressings of synthetic resinous material consisting of two pairs of pressings in the same plane, said pressings in each pair having adjacent edges disposed in parallel spaced relationship, said adjacent edges of both said pairs of pressings being in line, a deformable metal strip interposed between said adjacent edges of one of said pairs of pressings and extending continuously throughout the length of said pair of pressings, said strip comprising a head portion and a base portion, an abutment for said pair of pressings associated with said base portion, and an extension of said strip and of said abutment between said adjacent edges of said other pair of pressings upon at least a substantial part thereof, said head portion being deformed into engagement with said adjacent edges of both said pairs of pressings and clamping said adjacent edges of both said pairs of pressings against said abutment to connect all said pressings in fixed relationship.

HEINRICH ERNST WILHELM QUEST.